(12) United States Patent
Glassmoyer et al.

(10) Patent No.: US 11,623,734 B2
(45) Date of Patent: Apr. 11, 2023

(54) APPARATUS, SYSTEM AND METHOD FOR SUPPORTING A WING FLAP OF AN AIRCRAFT

(71) Applicant: The Boeing Company, Chicago, IL (US)

(72) Inventors: Christopher G. Glassmoyer, Kirkland, WA (US); Michael A. Balzer, Bellevue, WA (US); Jan A. Kordel, Redmond, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/488,895

(22) Filed: Sep. 29, 2021

(65) Prior Publication Data

US 2022/0185449 A1 Jun. 16, 2022

Related U.S. Application Data

(60) Provisional application No. 63/120,341, filed on Dec. 2, 2020.

(51) Int. Cl.
*B64C 9/02* (2006.01)
*B64C 13/24* (2006.01)
*B64C 9/04* (2006.01)
*B64C 3/18* (2006.01)

(52) U.S. Cl.
CPC .................. *B64C 9/02* (2013.01); *B64C 9/04* (2013.01); *B64C 13/24* (2013.01); *B64C 3/185* (2013.01)

(58) Field of Classification Search
CPC .. B64C 9/02; B64C 9/04; B64C 13/24; B64C 3/185
See application file for complete search history.

(56) References Cited

U.S. PATENT DOCUMENTS

| 2,271,509 | A | | 1/1942 | Rouanet | |
|---|---|---|---|---|---|
| 2,932,473 | A | | 4/1960 | Kass | |
| 3,002,717 | A | | 10/1961 | Pavlecka | |
| 3,229,935 | A | | 1/1966 | Bellanca | |
| 3,883,093 | A | | 5/1975 | Violleau | |
| 4,479,620 | A | * | 10/1984 | Rogers | B64C 9/00 244/90 R |
| 4,542,869 | A | * | 9/1985 | Brine | B64C 9/16 244/216 |
| 4,576,347 | A | | 3/1986 | Opsahl | |
| 4,667,905 | A | | 5/1987 | Hamm | |
| 4,962,904 | A | | 10/1990 | Perry | |
| 5,207,400 | A | * | 5/1993 | Jennings | B64C 9/16 244/216 |
| 5,501,414 | A | | 3/1996 | Bauer | |
| 5,884,872 | A | | 3/1999 | Greenhalgh | |
| 6,237,873 | B1 | | 5/2001 | Amaoka et al. | |

(Continued)

FOREIGN PATENT DOCUMENTS

EP 0154047 A1 * 9/1985 ............... B64C 9/04

*Primary Examiner* — Rodney A Bonnette
(74) *Attorney, Agent, or Firm* — Walters & Wasylyna LLC

(57) ABSTRACT

An apparatus for supporting a wing flap of an aircraft includes a support fitting configured to be coupled to a wing of the aircraft. The apparatus also includes a first link, pivotably coupled to the support fitting and configured to be pivotably coupled to the wing flap, and a second link, separably coupled to the support fitting and configured to be pivotably coupled to the wing flap.

20 Claims, 13 Drawing Sheets

(56) References Cited

U.S. PATENT DOCUMENTS

| | | |
|---|---|---|
| 6,698,688 B1 | 3/2004 | Jones |
| 7,681,835 B2 | 3/2010 | Simpson |
| 7,744,034 B2 | 6/2010 | Coughlin |
| 9,248,903 B2 | 2/2016 | Eden |
| 9,623,957 B2 | 4/2017 | Bleazard |
| 9,739,316 B2 | 8/2017 | Schwartz et al. |
| 9,856,014 B2 | 1/2018 | Osborn et al. |
| 10,017,273 B2 | 7/2018 | Jones |
| 10,538,306 B2 | 1/2020 | Kordel |
| 10,597,141 B2 | 3/2020 | Kordel et al. |
| 10,759,516 B2 | 9/2020 | Kordel et al. |
| 2002/0047068 A1* | 4/2002 | Uchida .................. B64C 13/30 244/99.3 |
| 2010/0019083 A1 | 1/2010 | Llamas et al. |
| 2012/0248257 A1* | 10/2012 | Eichhorn .................. B64C 9/04 74/99 R |
| 2013/0087662 A1* | 4/2013 | Soenarjo .................. B64C 9/18 244/215 |
| 2013/0146711 A1* | 6/2013 | Stewart .................. B64C 3/185 244/123.1 |
| 2013/0327887 A1* | 12/2013 | Dyckrup ............... B64C 13/341 244/99.3 |
| 2015/0329197 A1 | 11/2015 | Seack et al. |
| 2017/0010697 A1 | 1/2017 | Jiang et al. |
| 2021/0061442 A1* | 3/2021 | Tsai ........................ B64C 13/32 |
| 2022/0299063 A1* | 9/2022 | Smeal ....................... B64C 9/16 |

* cited by examiner

APPARATUS, SYSTEM AND METHOD FOR SUPPORTING A WING FLAP OF AN AIRCRAFT

PRIORITY

This application claims priority from U.S. Ser. No. 63/120,341 filed on Dec. 2, 2020.

FIELD

The present disclosure relates generally to the aerodynamic systems of aircraft and, more particularly, to apparatuses, systems and methods for supporting and actuating high-lift devices, such as wing flaps, of an aircraft.

BACKGROUND

Modern aircraft need to operate at various speeds, including a lower speed during take-off and landing and higher speed during cruise. At lower speeds, additional lifting surfaces, also known as high-lift devices, are sometimes needed to generate the required lift. High-lift devices may be utilized on wings of aircraft to increase lift or drag. One type of high-lift devices includes flaps on trailing edges of the wings. The flaps are moveable control surfaces that may be extended during take-off and landing and retracted at cruising speeds.

A variety of actuation and support systems may be utilized to extend and retract the flaps on the wing. Typically, such systems include a flap support that couples the flap to a fixed portion on the wing and an actuator that drives motion of the flap. Disconnection of the flap during flight, such as due to failure of the flap support, is potentially dangerous. Therefore, support structures often include redundancies to provide a secondary load path in scenarios where failure occurs in a primary load path. However, redundant support structures may be undesirably complex or heavy.

Furthermore, in certain scenarios, such as during an emergency or gear-up landing, it may be desirable for the flap to detach from the wing to prevent damage to the wing. However, redundant support structures may prevent disconnection of the flap in such a scenario.

Accordingly, those skilled in the art continue with research and development efforts in the field of flap actuation and support systems.

SUMMARY

Disclosed are examples of an apparatus for supporting a wing flap of an aircraft, an aerodynamic system of an aircraft, an aircraft and a method of supporting a wing flap. The following is a non-exhaustive list of examples, which may or may not be claimed, of the subject matter according to the present disclosure.

In an example, the disclosed apparatus includes a support fitting configured to be coupled to a wing of an aircraft. The apparatus also includes a first link, pivotably coupled to the support fitting and configured to be pivotably coupled to the wing flap, and a second link, separably coupled to the support fitting and configured to be pivotably coupled to the wing flap.

In another example, the disclosed apparatus includes a support fitting, configured to be coupled to a wing of an aircraft, and a linkage, pivotably coupled to the support fitting. The apparatus also includes a carrier fitting that includes a carrier first portion, pivotably coupled to the linkage, and a carrier second portion, extending from the carrier first portion at an oblique angle and configured to be coupled to the wing flap.

In an example, the disclosed aerodynamic system includes a support fitting, configured to be coupled to a wing of an aircraft, a first link, pivotably coupled to the support fitting, and a second link, separably coupled to the support fitting. The aerodynamic system also includes a carrier fitting, pivotably coupled to the first link and the second link, and a wing flap, coupled to the carrier fitting. The aerodynamic system further includes a drive mechanism configured to move the carrier fitting to move the wing flap between a retracted position and an extended position.

In an example, the disclosed aircraft includes a fuselage and a wing, outwardly extending from the fuselage. The aircraft also includes a support fitting, coupled to the wing, a first link, pivotably coupled to the support fitting, and a second link separably coupled to the support fitting. The aircraft further includes a carrier fitting, pivotably coupled to the first link and the second link, and a wing flap, coupled to the carrier fitting.

In an example, the disclosed method includes steps of: (1) moving a wing flap to an extended position; (3) bearing a load applied to the wing flap by a primary coupling; and (3) bearing the load applied to the wing flap by a secondary coupling upon failure of the primary coupling.

Other examples of the disclosed apparatus, system, aircraft and method will become apparent from the following detailed description, the accompanying drawings, and the appended claims.

DETAILED DESCRIPTION

Figure 1:
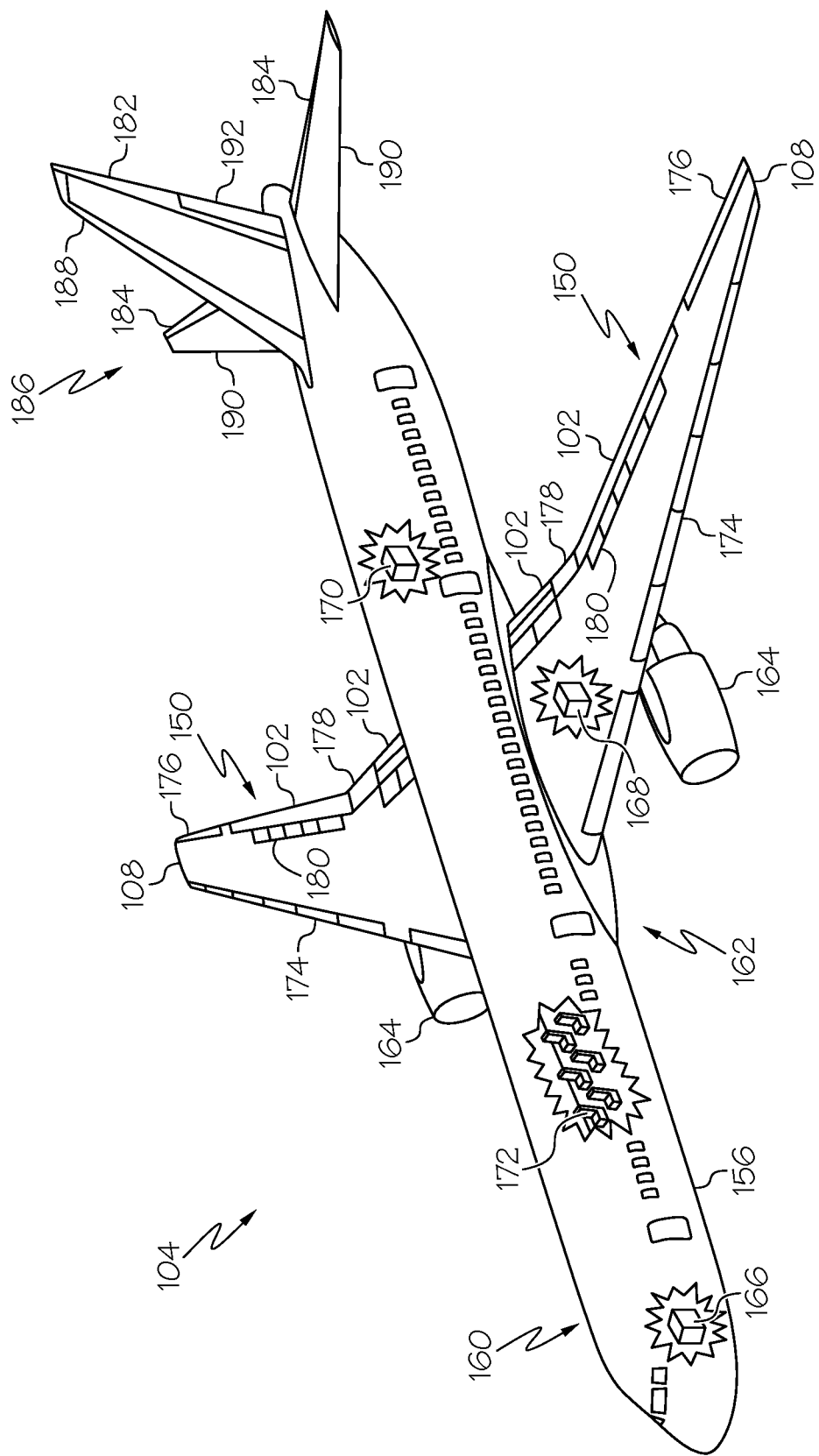
FIG. 1 is a schematic, perspective illustration of an example of an aircraft.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring to FIGS. 1-14, by way of examples, the present disclosure is directed to an apparatus for supporting a wing flap of an aircraft (referred to herein as "apparatus" 100). By way of examples, the present disclosure is also directed to an aerodynamic system of an aircraft (referred to herein as "system" 150). The present disclosure is further directed to the aircraft 104 that includes the disclosed system 150 and/or apparatus 100.

Generally, examples of the disclosed apparatus 100 provide structure for support and actuation of a flap coupled to a wing of an aircraft. Examples of the disclosed apparatus 100 also provide a fail-safe configuration that reduces the complexity, size and weight of the flap support structure. Examples of the disclosed apparatus 100 further provide a mechanism for indication of a specific type of failure. Examples of the disclosed apparatus 100 additionally provide for disconnection of the flap in emergency scenarios.

Referring to FIG. 1, which schematically illustrates an aircraft 104 that utilizes the disclosed system 150 and apparatus 100. It can be appreciated that the example of the aircraft 104 is provided for the purpose of illustration and is not intended to be limiting. The principles of the apparatus 100, system 150 and method 1000 may be used with many different types of modern aircraft.

The aircraft 104 may include a plurality of aerodynamic high-lift devices. The high-lift devices are control surfaces that can be deployed (e.g., extended) and stowed (e.g., retracted) to selectively vary lift and/or drag. The high-lift devices may include, but are not limited to, flaps, slats, ailerons, flaperons, spoilers, rudders, elevators and the like.

The aircraft 104 includes a pair of wings 108 that extends outwardly from a fuselage 156. In an example, the aircraft 104 includes flaps 102 provided near a trailing edge of each wing 108. The flaps 102 may include outboard flaps, inboard flaps and/or midspan flaps. The flaps 102 may also be referred to herein as wing flaps. In an example, the aircraft 104 includes slats 174 provided near a leading edge of each wing 108. In an example, the aircraft 104 may also include spoilers 180, flaperons 178 and/or ailerons 176 provided near the trailing edge of each wing 108. The slats 174, flaps 102, spoilers 180, flaperons 178 and/or ailerons 176 are coupled to and configured to move relative to the wing 108.

In an example, the aircraft 104 includes an empennage 186 (e.g., at a tail portion of the fuselage 156) that includes a vertical stabilizer 188 and horizontal stabilizers 190. A rudder 182 and a rudder tab 192 are provided on and are configured to move relative to the vertical stabilizer 188. An elevator 184 is provided on and is configured to move relative to each one of the horizontal stabilizers 190.

The high-lift devices are supported by and configured to articulate using associated support and actuation systems. The configuration of the high-lift devices, such as the flaps 102, is provided for the purpose of illustration and is not intended to be limiting. Therefore, the aircraft 104 may have a different number and/or configuration of high-lift devices.

Figure 2:
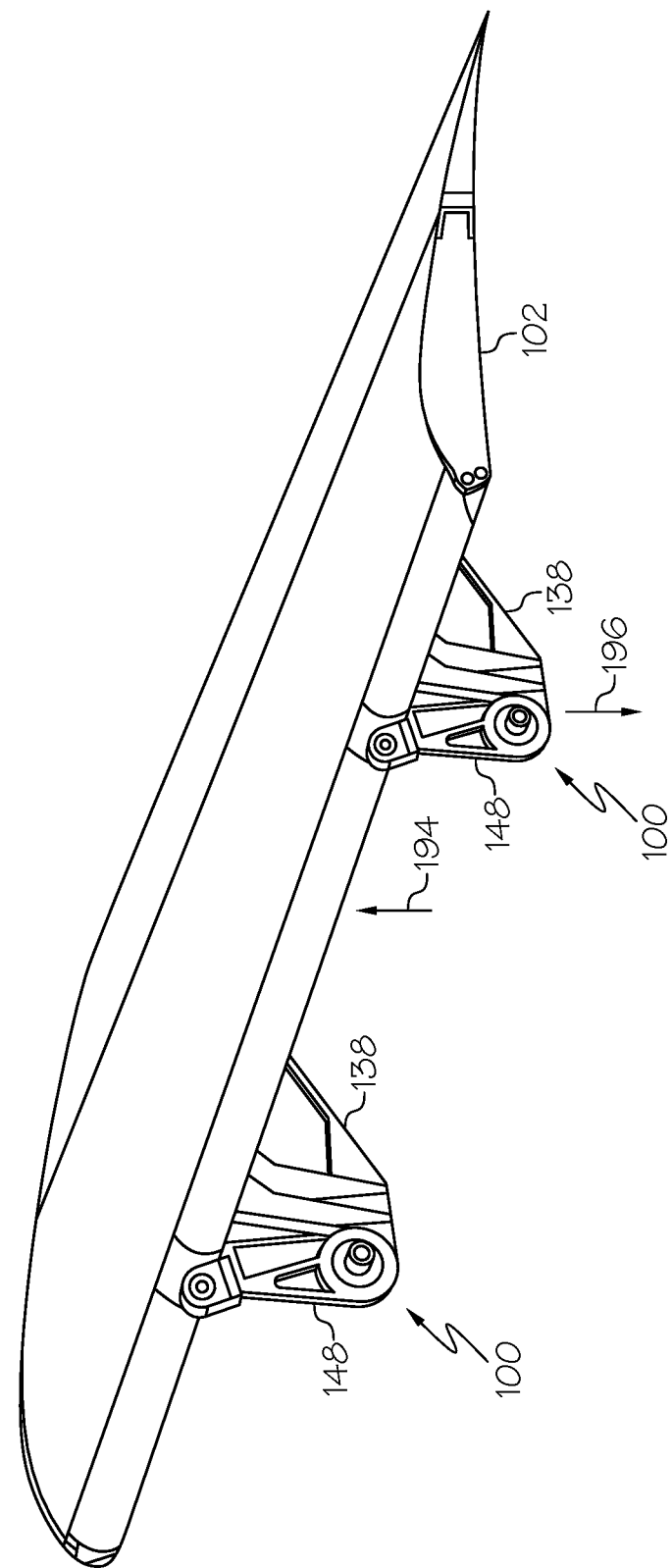
FIG. 2 is a schematic, perspective illustration of an example of a wing flap of the aircraft.

Referring to FIG. 2, which schematically illustrates an example of the wing flap 102. The wing flap 102 is configured to be coupled to a trailing edge of a wing (e.g., wing 108 shown in FIG. 1). The wing flap 102 is coupled to the wing 108 via at least one apparatus 100. For example, the wing flap 102 is shown coupled to the two apparatuses 100 (e.g., two flap supports). However, in other examples, the wing flap 102 may be coupled to a different number of apparatuses 100. For example, the wing flap 102 may be coupled to one apparatus 100 or three or more apparatuses 100.

In FIG. 2, a portion of the apparatus 100 is illustrated, including a linkage 148 and a carrier fitting 138. The linkage 148 is coupled to a fixed portion of the wing 108 and is pivotable relative to the wing 108. The carrier fitting 138 is coupled to the linkage 148 and is pivotable relative to the linkage 148. The carrier fitting 138 is coupled to (e.g., is configured to be coupled to) the wing flap 102. Thus, the linkage 148 provides a hinge connection between the wing 108 and the carrier fitting 138 that enables hinged (e.g., pivotal) movement of wing flap 102 relative to the wing 108. An actuator (not shown in FIG. 2) is configured to move the wing flap 102 relative to the wing 108 between a retracted position and an extended position.

During flight, the wing flap 102 is configured to hingedly move (e.g., rotate or pivot) about the linkage 148 as well as other rotation points (not shown) that are built into the wing flap 102 to adjust a position of the wing flap 102 relative to the fixed portion of the wing 108. The wing flap 102 is configured to move through a range of motion, such as during take-off and landing. A position of the wing flap 102 may also be selectively adjusted at cruise conditions.

During flight, forces from a number of different sources act on the wing flap 102. For examples, the wing flap 102 experiences aerodynamic loads, such as indicated by arrow 194, which vary according to the selected position of the wing flap 102, the orientation of the aircraft 104 and other flight conditions. The wing flap 102 also experiences a load via connection to the wing 108 through the apparatus 100, such as indicated by arrow 196.

While examples of the system 150 and apparatus 100 are described and illustrated with respect to the wing flap 102, the principles of the system 150 and apparatus 100 may be used with other high-lift devices of the aircraft 104, such as those referenced above and illustrated in FIG. 1.

Figure 3:
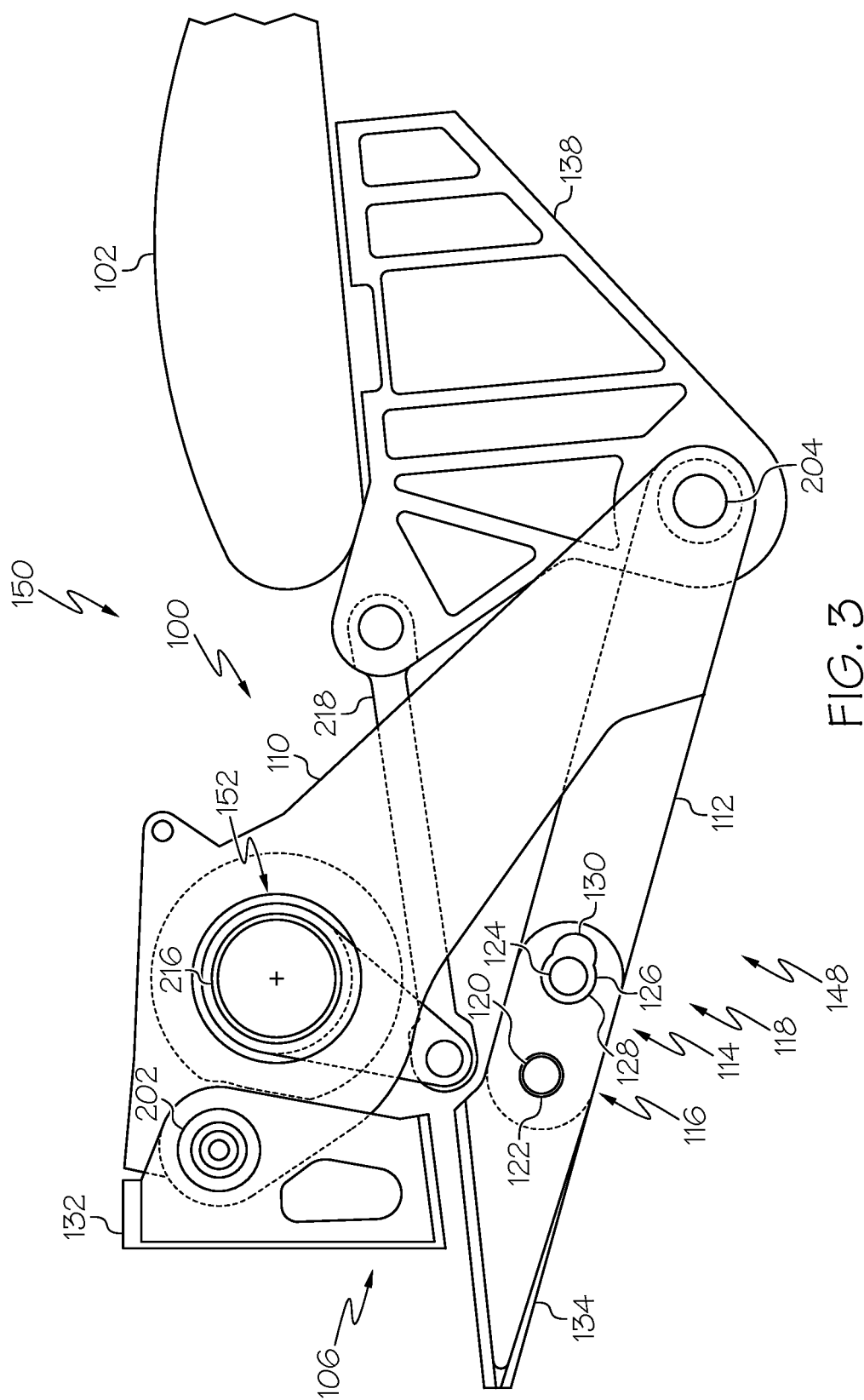
FIG. 3 is a schematic, elevation view of an example of an aerodynamic system of the aircraft for actuation and support of the wing flap.
Figure 4:
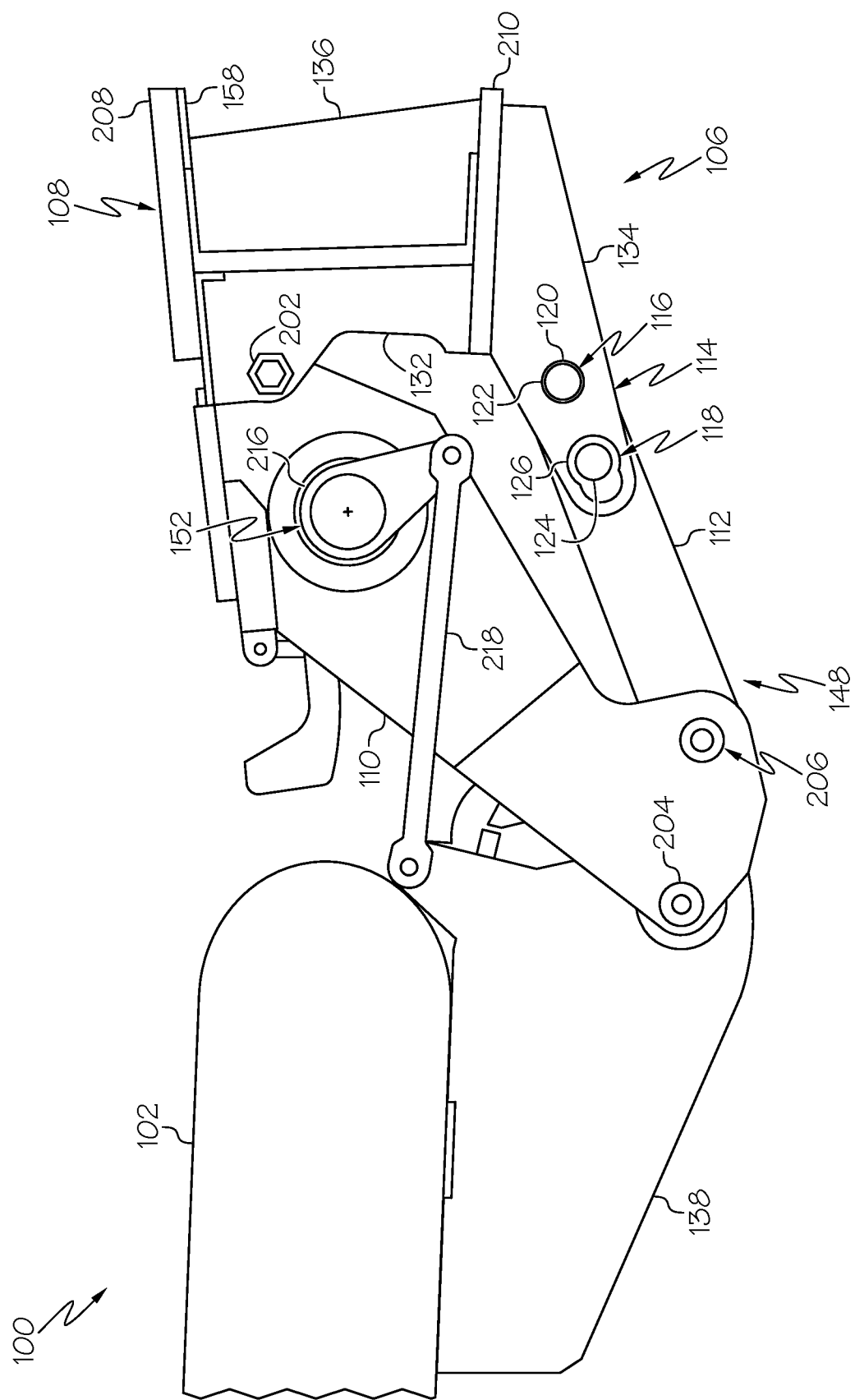
FIG. 4 is a schematic, elevation view of an example of the aerodynamic system.
Figure 7:
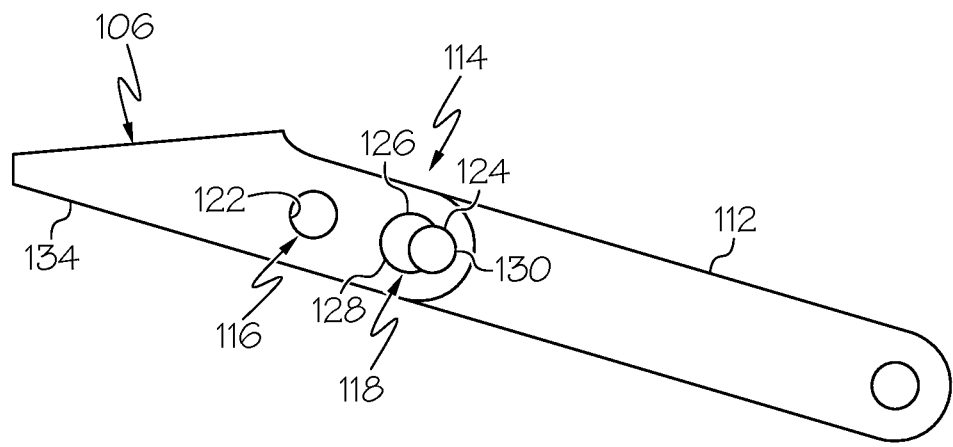
FIG. 7 is a schematic, elevation view of an example of the fail-safe joint, depicting a secondary coupling engaged upon failure of the primary coupling.
Figure 8:
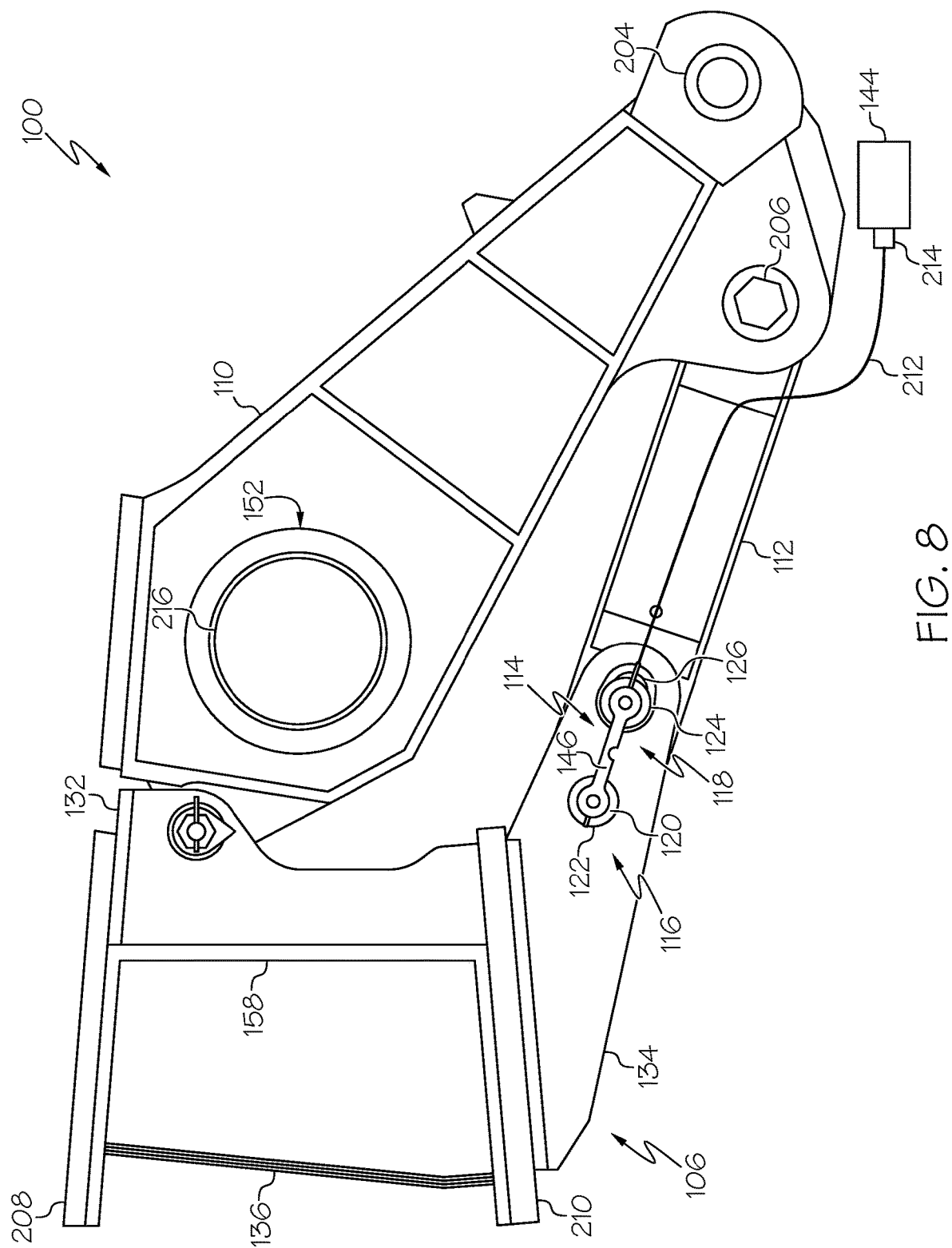
FIG. 8 is a schematic, elevation view of an example of a support apparatus of the aerodynamic system.
Figure 9:
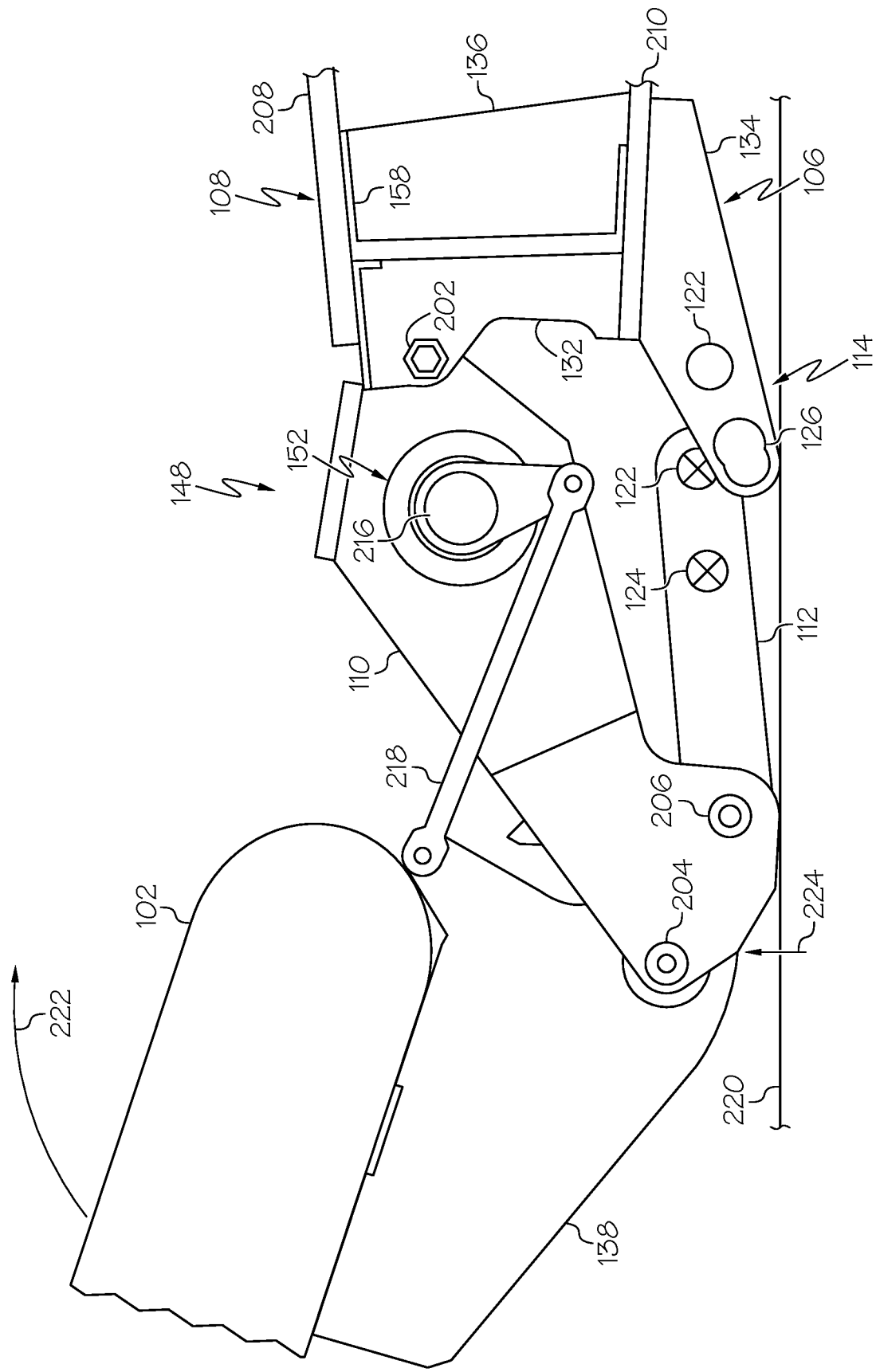
FIG. 9 is a schematic, elevation view of an example of the aerodynamic system coupled to a wing of the aircraft, depicting partial separation of the wing flap.

Referring now to FIGS. 3-11, which schematically illustrate examples of the system 150 and the apparatus 100. Generally, the apparatus 100 is a component of, or forms a part of, the system 150. The apparatus 100 is arranged between and is coupled to the fixed portion of the wing 108 (FIGS. 4 and 9) and the wing flap 102 (FIGS. 3, 4 and 9). The apparatus 100 supports the wing flap 102 and enables movement of the wing flap 102 relative to the wing 108. The system 150 includes the components of the apparatus 100 as well the wing flap 102 and additional components that drive and control movement of the wing flap 102. Therefore, the apparatus 100 may also be referred to as a flap support and the system 150 may also be referred to as a flap support mechanism or flap support assembly.

During normal operation, the apparatus 100 provides a primary load path between the wing 108 and the wing flap 102 via the linkage 148. In one or more examples, the linkage 148 includes a fail-safe feature that responds to a failure event along the primary load path. For example, the linkage 148 is configured to automatically, or inherently, provide a secondary load path in the event of failure along the primary load path such that operation of the wing flap 102 is maintained. Thus, the apparatus 100 provides load path redundancy, as may be required by an aircraft manufacturer or regulatory entity. For example, the apparatus 100 is designed to such that failure of a single principal structural element will not threaten continued safe flight and landing of the aircraft 104.

During normal operation, the linkage 148 enables movement of the wing flap 102 through an operating range of motion relative to the wing 108. In one or more examples, the linkage 148 is also configured to enable at least partial separation of the wing flap 102 from the wing 108. For example, at least a portion of the linkage 148 is configured to detach from the wing 108 in response to a predetermined break-away load, thereby enabling the wing flap 102 to move beyond its normal operating range of motion relative to the wing 108. Thus, in an emergency scenario, such as a gear-up landing, the wing flap 102 and a portion of the apparatus 100 may detach from the wing 108 to prevent breaking the wing and releasing fuel stored within the wing 108.

In one or more examples the apparatus 100 includes a support fitting 106. The support fitting 106 is configured to be coupled to the fixed portion of the wing 108 of the aircraft 104. The linkage 148 is coupled to the support fitting 106. The carrier fitting 138 is coupled to the linkage 148. The carrier fitting 138 is hingedly movable relative to the linkage 148. The carrier fitting 138 is configured to be coupled to the wing flap 102. Therefore, the linkage 148 couples the carrier fitting 138 to the support fitting 106 and, thus, the wing flap 102 to the wing 108 and facilitates hinged movement of the wing flap 102 relative to the wing 108. The linkage 148 provides the support structure and, thus, the load path between the carrier fitting 138 and the support fitting 106 and, thus between the wing flap 102 and the wing 108.

In one or more examples, the linkage 148 includes a first link 110 and a second link 112. During normal operating conditions, with the wing flap 102 deployed, the first link 110 is configured to receive a compressive load and the second link 112 is configured to receive a tensile load. Therefore, the first link 110 may also be referred to as a compression link and the second link 112 may also be referred to as a tension link. It can be appreciated that, in certain unique operating conditions (e.g., negative load conditions), this loading configuration may be reversed, such that with the wing flap 102 deployed, the first link 110 is configured to receive a tensile load and the second link 112 is configured to receive a compressive load.

In one or more examples, the first link 110 is coupled to the support fitting 106. The first link 110 is configured to be coupled to the wing flap 102, such as via the carrier fitting 138, so that the wing flap 102 can pivot relative to the first link 110. The second link 112 is separably coupled to the support fitting 106. The second link 112 is configured to be coupled to the wing flap 102, such as via the carrier fitting 138, so that the wing flap 102 can pivot relative to the second link 112.

The first link 110 and the second link 112 couple the carrier fitting 138 to the support fitting 106 and, thus, the wing flap 102 to the wing 108 and facilitate hinged movement of the wing flap 102 relative to the wing 108. The first link 110 and the second link 112 provide the support structure and, thus, the load path between the carrier fitting 138 and the support fitting 106 and, thus, between the wing flap 102 and the wing 108. Separability of the second link 112 from the support fitting 106 enables the carrier fitting 138 and, thus, the wing flap 102 to partially detach from the support fitting 106 and, thus, the wing 108 and facilitates movement of the wing flap 102 beyond its normal operating range of motion. As used herein, the terms "separable," "separably," "separate" and similar terms have their ordinary meaning as known to those skilled in the art and refer to the capability of one item to be parted, detached, disconnected, removed or dislocated from another item in response to a particular event, occurrence or condition.

Referring to FIGS. 3, 4 and 8, in one or more examples, the support fitting 106 includes a spar fitting 132 and a wing fitting 134. In an example, the spar fitting 132 is configured to be coupled to a spar 158 of the wing 108. The spar 158 extends (e.g., is nested) between and is coupled to an upper wing skin 208 and a lower wing skin 210 (e.g., as shown in FIGS. 4 and 8). In an example, the wing fitting 134 is configured to be coupled to the spar 158 under the wing 108 (e.g., through the lower wing skin 210) and/or to the lower wing skin 210 (e.g., as shown in FIGS. 4 and 8). In one or more examples, the first link 110 is hingedly coupled to the spar fitting 132 and the second link 112 is hingedly coupled to the wing fitting 134.

In one or more examples, the support fitting 106 also includes a backup fitting 136 (e.g., FIGS. 4 and 8). The backup fitting 136 is configured to be coupled to the spar 158, opposite the spar fitting 132.

As illustrated in FIG. 3, in one or more examples, the first link 110 includes a first end that is coupled to the support fitting 106 (e.g., the spar fitting 132) via a first joint 202. The first link 110 include a second end, opposite the first end, that is coupled to the carrier fitting 138 via a second joint 204. The second link 112 includes a first end that is coupled to the support fitting 106 (e.g., the wing fitting 134) via a fail-safe joint 114. The second link 112 includes a second end, opposite the first end, that is coupled to the carrier fitting 138 via the second joint 204.

In one or more examples, the first joint 202 may be a hinge joint that enables the first link 110 to pivot relative to the support fitting 106. The second joint 204 may be a hinge joint that enables the carrier fitting 138 to pivot relative to the first link 110 and that enables the carrier fitting 138 to pivot relative to the second link 112.

As illustrated in FIG. 4, in one or more examples, the first end of the first link 110 is coupled to the support fitting 106 (e.g., the spar fitting 132) via the first joint 202. The second end of the first link 110 is coupled to the carrier fitting 138 via the second joint 204. The first end of the second link 112 is coupled to the support fitting 106 (e.g., the wing fitting 134) via the fail-safe joint 114. The second end of the second link 112 is coupled to the first link 110 via a third joint 206.

In one or more examples, the first joint 202 may be a hinge joint that enables the first link 110 to pivot relative to the support fitting 106. The second joint 204 may be a hinge joint that enables the carrier fitting 138 to pivot relative to the first link 110. The third joint 206 may be a hinge joint that enables the first link 110 to pivot relative to the second link 112.

Referring again to FIGS. 3 and 4, in one or more examples, the fail-safe joint 114 couples the second link 112 and the support fitting 106 together and bears the load between the second link 112 and the support fitting 106 during operation of the wing flap 102. The fail-safe joint 114 is configured to respond to a failure event in a primary (e.g., tensile) load path between the carrier fitting 138 and the support fitting 106 (e.g., between the wing flap 102 the wing 108) along the second link 112. For example, under normal operating conditions, the fail-safe joint 114 is configured to automatically, or inherently, provide a secondary load path along the second link 112 in the event of failure in the primary load path such that connection and hinged movement between the second link 112 and the support fitting 106 and, thus, between the wing flap 102 and the wing 108 is maintained. Thus, the fail-safe joint 114 provides load path redundancy that maintains proper operation of the wing flap 102 following a failure event.

In one or more examples, the first joint 202, the second joint 204 and the third joint 206 may include, or take the form of, any mechanical joint that is configured to retain two items together and, optionally, enable at least partial rotation of one of the items relative to the other one of the items. For example, the first joint 202, the second joint 204 and the third joint 206 may include components such as bearings, posts, cylinders, rods, axles, bolts and the like.

It can be appreciated that the apparatus 100 may have alternative configurations guided by the teachings herein provided. In other examples, the apparatus 100 may include alternative configurations of the linkage 148 (e.g., first link 110 and second link 112), alternative configurations of the support fitting 106 (e.g., spar fitting 132, wing fitting 134 and backup fitting 136), alternative locations and number of the joints between components (e.g., first joint 202, second joint 204 and third joint 206) and the like.

Figure 5:
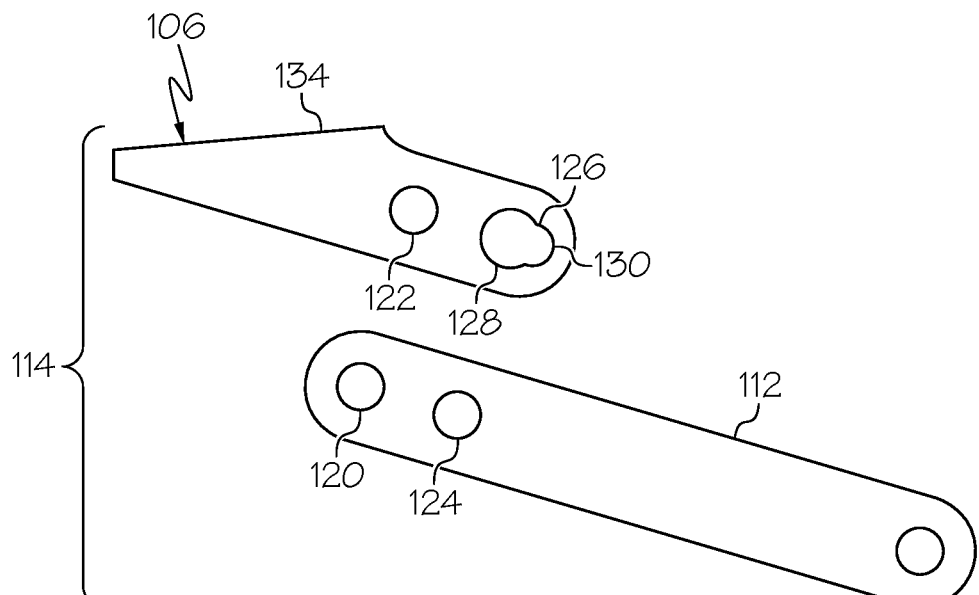
FIG. 5 is a schematic, exploded, elevation view of an example of a fail-safe joint of the aerodynamic system.
Figure 6:
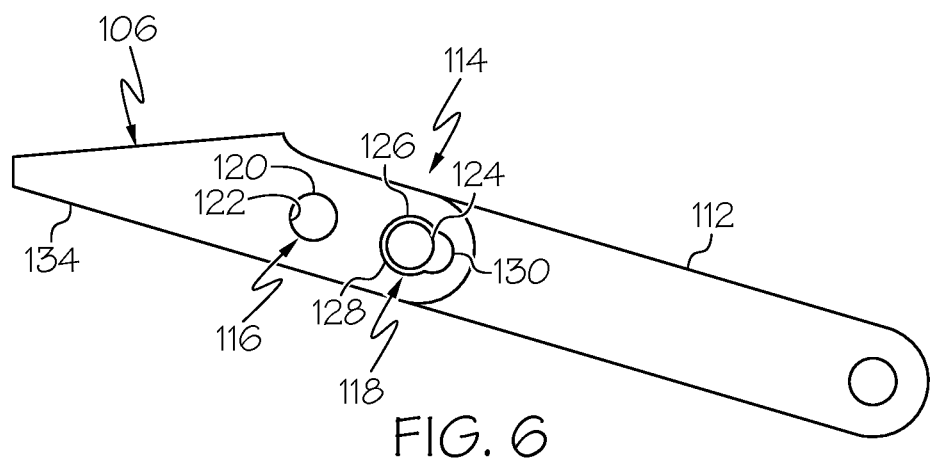
FIG. 6 is a schematic, elevation view of an example of the fail-safe joint, depicting a primary coupling engaged.

Referring generally to FIGS. 3 and 4 and particularly to FIGS. 5-7, in one or more examples, the fail-safe joint 114 includes a primary coupling 116 and a secondary coupling 118. The primary coupling 116 is configured to bear a load between the second link 112 and the support fitting 106. The secondary coupling 118 is configured to bear the load between the second link 112 and the support fitting 106 upon failure of the primary coupling 116.

The primary coupling 116 includes a joint that retains the second link 112 to the support fitting 106. During normal operation, the primary coupling 116 is engaged to bear the load between the second link 112 and the support fitting 106 (e.g., as shown in FIG. 6). With the second link 112 coupled to the support fitting 106 via the primary coupling 116, the secondary coupling 118 is disengaged and unloaded (e.g., as shown in FIG. 6). The secondary coupling 118 includes a joint that is configured to retain the second link 112 to the support fitting 106 upon failure of the primary coupling 116. In event of failure of the primary coupling 116, the secondary coupling 118 is configured to automatically engage to bear the load between the second link 112 and the support fitting 106 (e.g., as shown in FIG. 7).

In one or more examples, the primary coupling 116 includes a primary pin aperture 122 and a primary pin 120. The primary pin aperture 122 is formed in the support fitting 106 (e.g., the wing fitting 134). The primary pin 120 is fixed to the second link 112 and is received by the primary pin aperture 122.

In one or more examples, the secondary coupling 118 includes a secondary pin aperture 126 and a secondary pin 124. The secondary pin aperture 126 is formed in the support fitting 106 (e.g., the wing fitting 134). The secondary pin aperture 126 takes the form of a slotted hole that includes an aperture first portion 128 and an aperture second portion 130 that is in volumetric communication with the aperture first portion 128. The secondary pin 124 is fixed to the second link 112 and is received by the aperture first portion 128 of the secondary pin aperture 126 when the primary pin 120 is in the primary pin aperture 122.

The secondary pin 124 is configured to move into the aperture second portion 130 of the secondary pin aperture 126 upon failure of the primary pin 120, for example, because of fatigue cracking. For example, upon failure of the primary pin 120, the fail-safe joint 114 shifts slightly causing the secondary pin 124 to slide in the secondary pin aperture 126 from the aperture first portion 128 to the aperture second portion 130 until it bottoms out, thus restoring the load path and preventing the loss of the wing flap 102.

In one or more examples, during normal operation, the primary pin 120 is located in the primary pin aperture 122 and is engaged with the support fitting 106 (e.g., the wing fitting 134) so that the primary pin 120 is loaded to bear the load between the second link 112 and the support fitting 106 (e.g., as shown in FIG. 6). With the second link 112 coupled to the support fitting 106 via the primary pin 120, the secondary pin 124 is located in the secondary pin aperture 126 and is disengaged from the support fitting 106 (e.g., the wing fitting 134) so that the secondary pin 124 is unloaded (e.g., as shown in FIG. 6). In event of failure of the primary pin 120, the secondary pin 124 is configured to automatically engage the support fitting 106 and becomes loaded to bear the load between the second link 112 and the support fitting 106 (e.g., as shown in FIG. 7).

Figure 11:
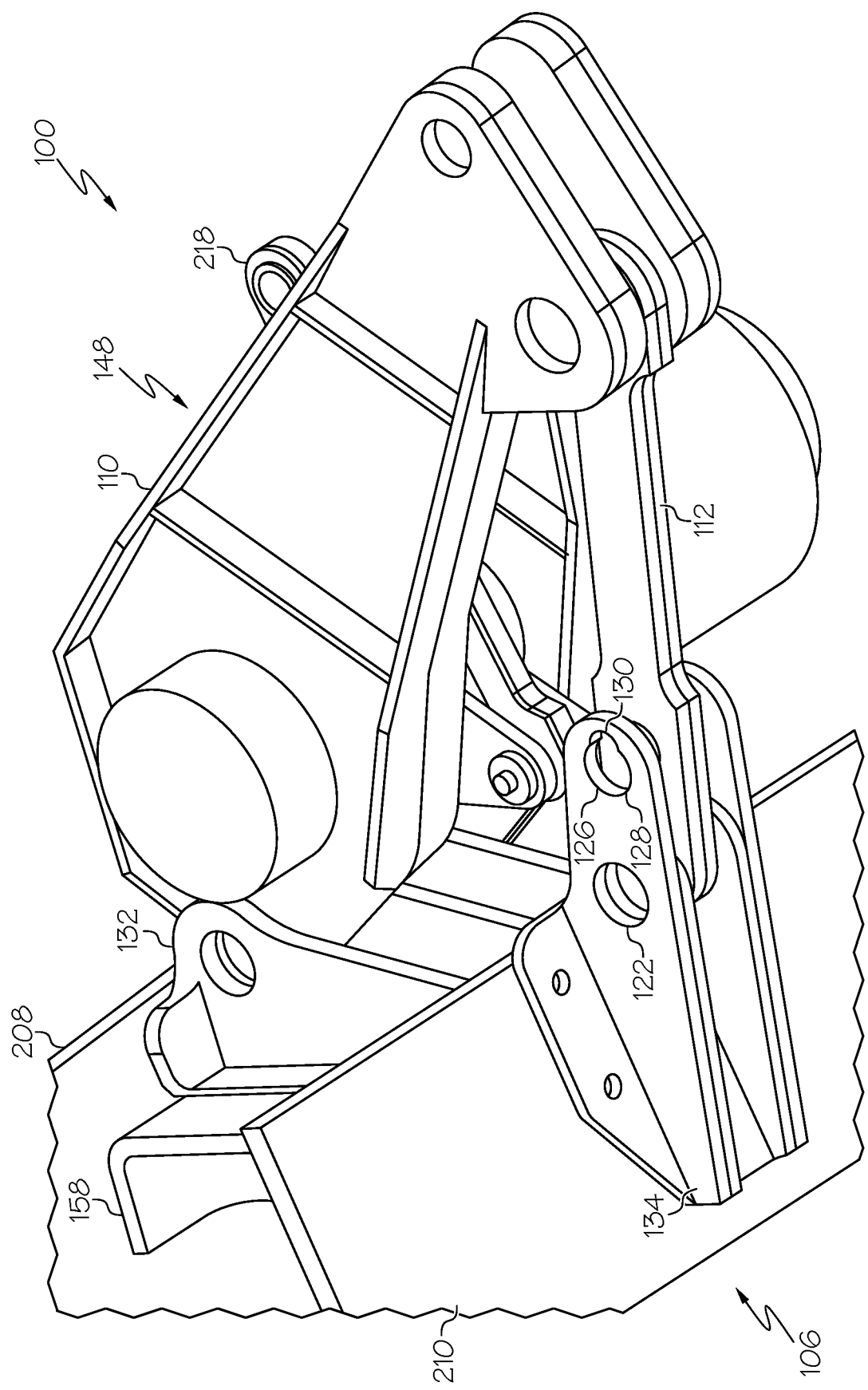
FIG. 11 is a schematic, bottom perspective view of an example of the support apparatus.

In one or more examples, the fail-safe joint 114 includes, or takes the form of, a clevis joint fastener (e.g., as shown in FIG. 11). For example, the support fitting 106 (e.g., the wing fitting 134) is a clevis. The first end of the second link 112 is a tang. The primary pin aperture 122 is a first hole at the end of each prong of the clevis. The primary pin 120 is a first clevis pin that is accepted by the first holes and that retains the tang between the prongs of the clevis. The secondary pin aperture 126 is a second hole at the end of each prong of the clevis. The secondary pin 124 is a second clevis pin that is accepted by the second holes and that retains the tang between the prongs of the clevis upon failure of the primary pin 120.

Alternatively, in one or more examples, the primary pin aperture 122 is formed in the second link 112 and the primary pin 120 is fixed to the support fitting 106 (e.g., the wing fitting 134) and is received by the primary pin aperture 122. The secondary pin aperture 126 is formed in the second link 112 and the secondary pin 124 is fixed to the support fitting 106 (e.g., the wing fitting 134) and is received by the aperture first portion 128 of the secondary pin aperture 126 when the primary pin 120 is in the primary pin aperture 122. The secondary pin 124 is configured to move into the aperture second portion 130 of the secondary pin aperture 126 upon failure of the primary pin 120. In these examples, the support fitting 106 (e.g., the wing fitting 134) is the tang and the first end of the second link 112 is the clevis.

In one or more examples, the primary pin 120 and the primary pin aperture 122 are respectively sized such that the primary pin 120 fits in the primary pin aperture 122 in suitable tolerance to contact the support fitting 106 and transfer the load between the second link 112 and the support fitting 106. As an example, a diameter of the primary pin aperture 122 and a diameter of the primary pin 120 are sized for a transition fit or an interference fit. As another example, the primary pin 120 fits within a bushing that is coupled to the support fitting 106 and that forms the primary pin aperture 122 via a very small (e.g., "class 1") clearance fit joint.

In one or more examples, the secondary pin 124 and the aperture first portion 128 of the secondary pin aperture 126 are respectively sized such that the secondary pin 124 fits in the aperture first portion 128 in suitably tolerance to avoid contact with the support fitting 106 when the primary pin 120 is in the primary pin aperture 122. For example, a diameter of the aperture first portion 128 of the secondary pin aperture 126 and the diameter of the secondary pin 124 are sized for a clearance fit.

In one or more examples, the secondary pin 124 and the aperture second portion 130 of the secondary pin aperture 126 are respectively sized such that the secondary pin 124 fits in the aperture second portion 130 in suitably tolerance to contact with the support fitting 106 and transfer the load between the second link 112 and the support fitting 106 upon failure of the primary pin 120. For example, a diameter of the aperture second portion 130 of the secondary pin aperture 126 and the diameter of the secondary pin 124 are sized for a transition fit or an interference fit.

In one or more examples, in event of failure of the primary pin 120, the secondary pin 124 is configured to automatically shift position (e.g., move) within the secondary pin aperture 126 from the aperture first portion 128 to the aperture second portion 130 to be loaded and bear the load between the second link 112 and the support fitting 106.

Referring now to FIG. 8, in one or more examples, the apparatus 100 includes a sensor 144. The sensor 144 is configured to detect the failure of the primary coupling 116. In one or more examples, the sensor 144 is configured to detect when the secondary pin 124 moves into the aperture second portion 130 of the secondary pin aperture 126. The sensor 144 may include any one of various types of sensors.

As an example, the sensor 144 may be a position sensor that detects linear movement of or a change in linear position of the second link 112 relative to the support fitting 106 (e.g., the wing fitting 134) when the secondary pin 124 moves from the aperture first portion 128 to the aperture second portion 130 of the secondary pin aperture 126.

As another example, the sensor 144 may include an electric circuit and a connector 214 that closes the circuit. The sensor 144 may be coupled to a fixed portion of the first link 110 or the carrier fitting 138 (not shown in FIG. 8), such as at the second joint 204 or the third joint 206. For example, the sensor 144 may be integrated with a wing flap skew detection system. The connector 214 is removably coupled to the sensor 144 to close the circuit. The connector 214 is also coupled to support fitting 106 via a sensor coupling 212 having a fixed length that is equal to the distance between the sensor 144 and the support fitting 106 when the primary pin 120 is in the primary pin aperture 122. Upon failure of the primary pin 120 and movement of the secondary pin 124 into the aperture second portion 130 of the secondary pin aperture 126, the sensor 144 (e.g., fixed portion of the first link 110 or the carrier fitting 138) moves slightly away from the support fitting 106 such that the sensor coupling 212 pulls the connector 214 out of connection with the sensor 144 to open the circuit.

Regardless of the configuration of the sensor 144, the sensor 144 provides a real-time indication of a malfunction in the system 150, such as failure of the primary coupling 116 (e.g., the primary pin 120) and thus, of the primary load path. This indication may trigger further inspection of the apparatus 100, the system 150 and/or the aircraft 104.

In one or more examples, the apparatus 100 includes a pin coupling 146. The pin coupling 146 is coupled to the primary pin 120 and to the secondary pin 124. The pin coupling 146 is configured to break or detach when the primary pin 120 fails and the secondary pin 124 moves into the aperture second portion 130 of the secondary pin aperture 126. Thus, the pin coupling 146 provides visual indication of a malfunction in the system 150, such as failure of the primary coupling 116 (e.g., the primary pin 120) and thus, of the primary load path. This visual indication may trigger further inspection of the apparatus 100, the system 150 and/or the aircraft 104.

Accordingly, the primary coupling 116 and the secondary coupling 118 of the fail-safe joint 114 provide a structural and load path redundancy in the apparatus 100, which satisfies required fail-safe criteria without the need for complex and heavy redundant structures. The second link 112 and the fail-safe joint 114 are designed to be fail-safe for tensile loads. For example, if primary coupling 116 was to fail, the tensile load can be redistributed to the intact secondary coupling 118 and be safely reacted.

Referring generally to FIGS. 3-8 and particularly to FIG. 9, in one or more examples, the fail-safe joint 114 is configured to separate the second link 112 from the support fitting 106 in response to a load having a predetermined magnitude. FIG. 9 illustrates the second link 112 separated from the support fitting 106 (e.g., the wing fitting 134) at the fail-safe joint 114. In FIG. 9, the primary pin 120 and the secondary pin 124 are schematically illustrated to represent a post-failure condition or state of the primary pin 120 and the secondary pin 124 following application of the load (e.g., breakaway load) having the predetermined magnitude and separation of the second link 112 from the support fitting 106.

In one or more examples, the load is a shear load. The primary pin 120 is configured to fail, or shear, at the load having the predetermined magnitude. Similarly, the secondary pin 124 is configured to fail, or shear, at the load having the predetermined magnitude. As such, the primary pin 120 and the secondary pin 124 may be shear pins that bear lateral loads and that shear at a certain maximum load.

In one or more examples, each one of the primary pin 120 and the secondary pin 124 includes a hollow tubular body. The hollow tubular body of the primary pin 120 and the secondary pin 124 is configured to fail in response to the load having a predetermined magnitude. Such pins are commonly referred to as fuse pins.

A structural fuse pin is essentially a pin with a hollowed-out center intended to provide a point of failure at a specific load. Design and manufacturing of a fuse pin typically requires machining out of the center of the pin to limit the strength to a predetermined level. Different methods may be used during manufacturing to ensure the fuse pin strength is kept at the specified level. For example, during manufacturing of the fuse pins, each material lot can be tested to determine the strength level of that batch. The final diameter of the machining of the fuse pins made from each material lot can be varied to correlate to the demonstrated strength properties of the material.

In one or more examples, the primary coupling 116 is configured to separate the second link 112 from the support fitting 106 in response to a first instance of the load having the predetermined magnitude. For example, the primary pin 120 is configured to fail in response to a shear load having the predetermined magnitude. The secondary coupling 118 is configured to separate the second link 112 from the support fitting 106 in response to a second instance of the load having the predetermined magnitude. For example, the secondary pin 124 is configured to fail in response to a shear load having the predetermined magnitude.

The apparatus 100 may include provisions to prevent rupture of the wing 108 and release of fuel stored in the wing 108 in the event of wing flap breakaway caused by overloads from abnormal landing or takeoff. Fail-safe joint 114 (e.g., the second link-to-support fitting attachment) includes the pair of structural fuse pins (e.g., the primary pin 120 and the secondary pin 124), which are hollow pin having less strength than the adjacent structure. As an example, the support fitting 106 is designed to be stronger than the second link 112, the primary pin 120 and the secondary pin 124, thus assuring that when a structural overload occurs, the primary pin 120 and the secondary pin 124 fail first and the wing structure (fuel tank) remains intact. For example, the second link 112 and the fuse pins (primary pin 120 and secondary pin 124) at the fail-safe joint 114 are designed for a maximum load on the structure (e.g., ultimate load) and the support fitting 106 (e.g., backup structure) is designed for a maximum fuse pin load (e.g., that is greater than a minimum load that is greater than or equal to the ultimate load).

As illustrated in FIG. 8, in an example, such as during a gear-up landing, the apparatus 100 may contact a ground surface 220. The apparatus 100 and/or the wing flap 102 may experience a break-away load via impact and/or contact with the ground surface 220, such as indicated by arrow 224. At a first instance of the break-away load having a magnitude greater than the predetermined magnitude, the primary pin 120 fails. At a second instance of the break-away load having a magnitude greater than the predetermined magnitude, the secondary pin 124 fails. Upon failure of the primary pin 120 and the secondary pin 124, the second link 112 detaches from the support fitting 106 such that the first link 110 can pivot relative to the support fitting 106 and the first link 110, the carrier fitting 138 and the wing flap 102 can pivot relative to the wing 108 beyond the normal operating range of motion, as indicated by arrow 222.

Since the primary pin 120 and the secondary pin 124 are arranged to be sheared in a sequence, the total load is limited to the amount required to shear a single pin. Therefore, the load imparted to the wing 108 and the fuel tank is significantly reduced as compared to other failsafe flap support designs. A reduction in load also reduces the weight of all parts involved. Accordingly, use of the primary pin 120 and the secondary pin 124 provide a design that satisfies fail-safety requirements, but that enables an instance of a load having a lower magnitude to separate the wing flap 102 from the wing 108 as compared to conventional fail-safe designs that rely on bolts bending, parts prying, pins that include an external hollow pin and an internal pin and redundant load paths, which make breakaway loads larger and result in heavier structures.

Figure 10:
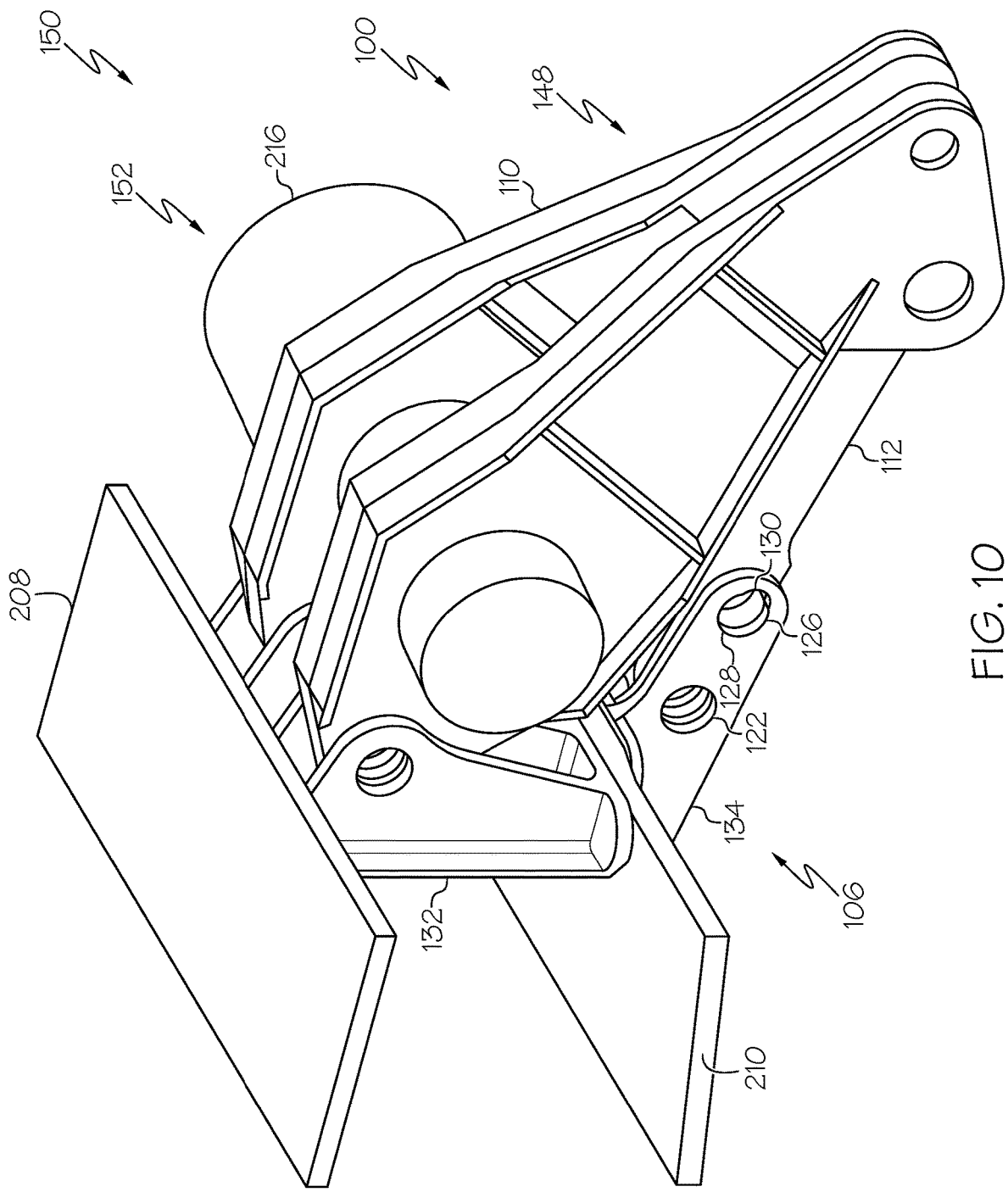
FIG. 10 is a schematic, side perspective view of an example of the support apparatus.

Referring now to FIGS. 10 and 11, in one or more examples, one or more of the structural elements of the apparatus 100 is designed such that failure of a single principal structural element will not threaten continued safe flight and landing of the aircraft 104. For example, at least a portion of one or more of the structural elements of the apparatus 100 includes a double-layered construction. Generally, double-layered construction of a structural element refers to a structure that includes two matching components that are arranged back-to-back and coupled together. In this arrangement, if one component of the structural element having the double-layered construction was to fail, the load can be redistributed to the other component of the structural element and be safely reacted. In FIGS. 10 and 11, the primary pin 120 and the secondary pin 124 are not shown for the purpose of clarity of illustration.

Figure 14:
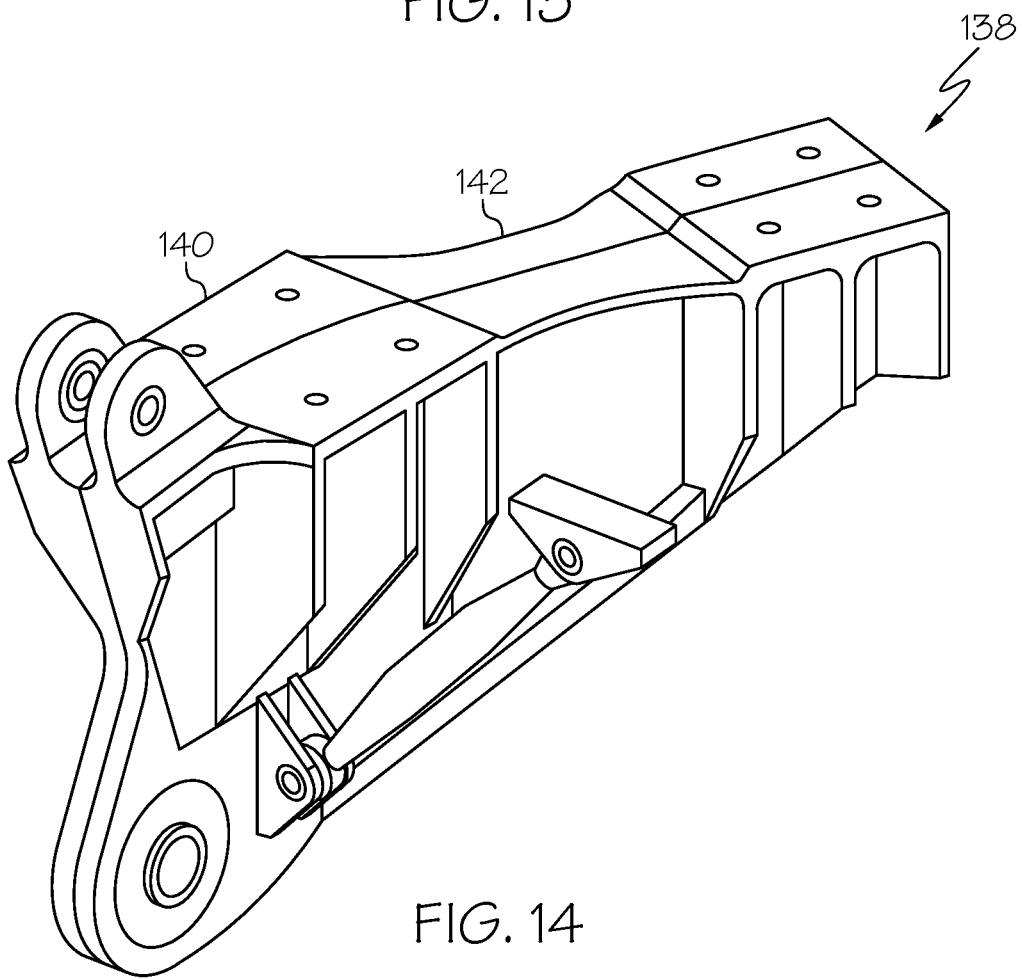
FIG. 14 is a schematic, perspective view of an example of the carrier fitting of the support apparatus.

As illustrated in FIG. 11, in one or more examples, the second link 112 includes the double-layered construction. As illustrated in FIGS. 10 and 11, in one or more examples, at least a portion of the first link 110 includes the double-layered construction. For example, at least a portion of the first link 110 proximate to the connection between the first link 110 and the second link 112 and/or between the first link 110 and the carrier fitting 138 includes the double-layered construction. As illustrated in FIG. 11, in one or more examples, at least a portion of the support fitting 106 includes the double-layered construction. For example, at least a portion of the wing fitting 134 proximate to the connection between wing fitting 134 and the second link 112 at the primary coupling 116 includes the double-layered construction. As illustrated in FIG. 14, in one or more examples, at least a portion of the carrier fitting 138 includes the double-layered construction.

Figure 12:
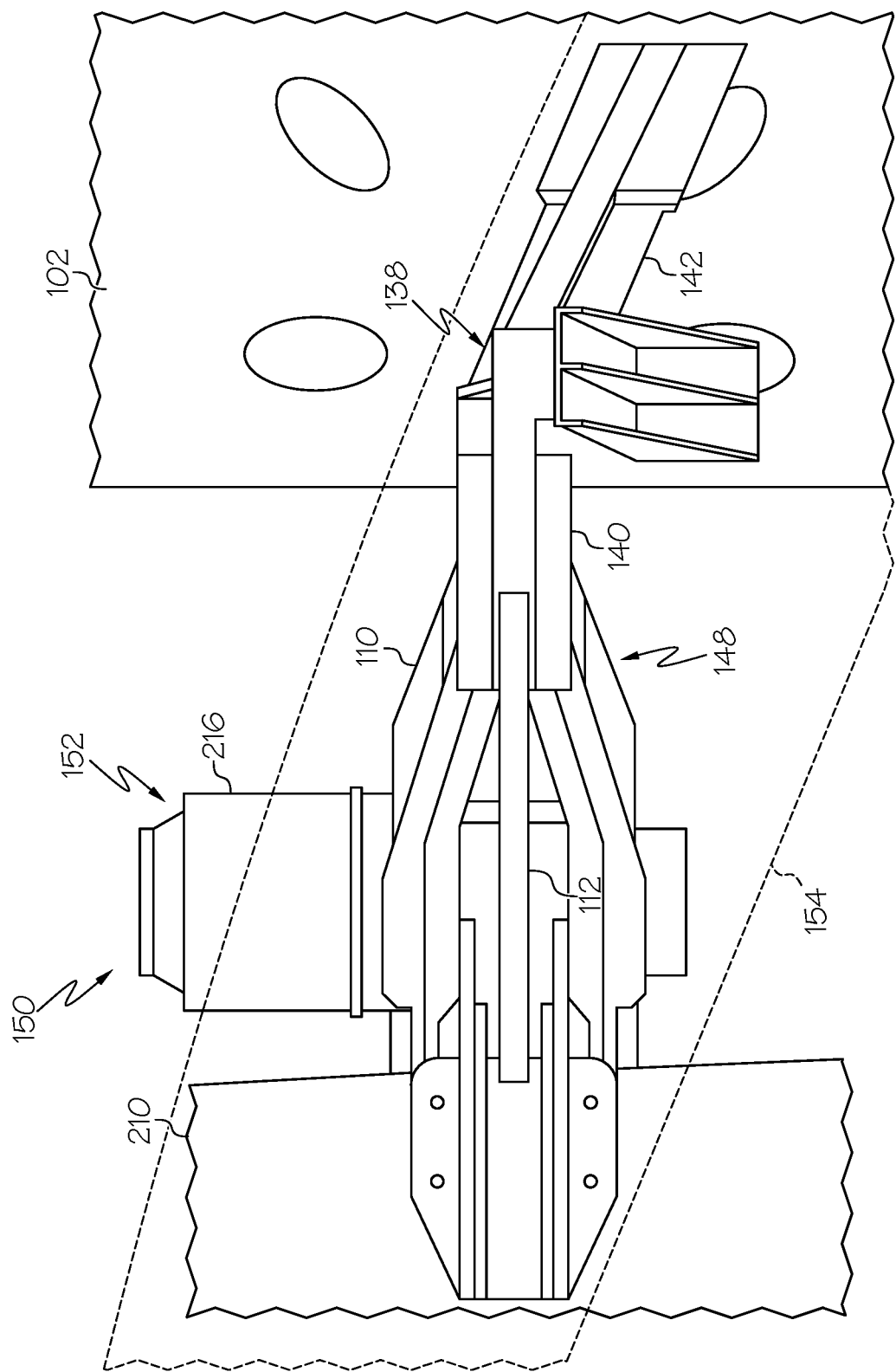
FIG. 12 is a schematic, bottom plan view of an example of the aerodynamic system.
Figure 13:
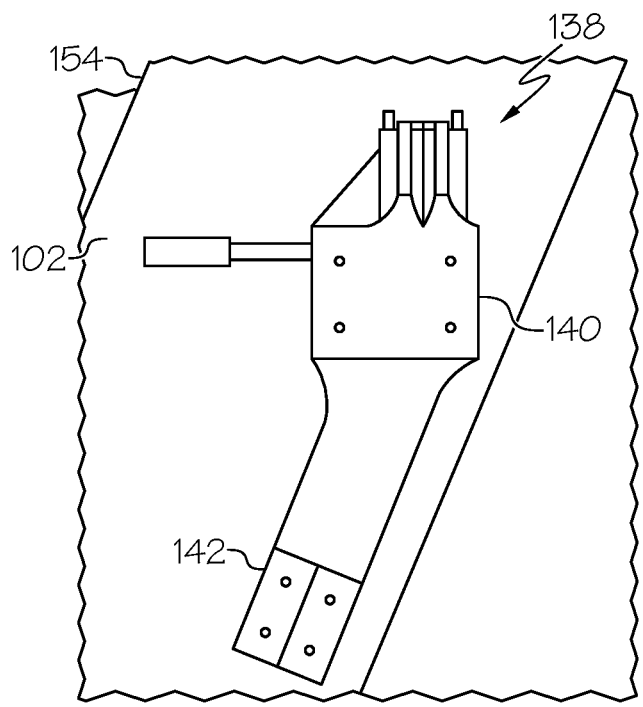
FIG. 13 is a schematic, bottom plan view of an example of a carrier fitting of the support apparatus coupled to the wing flap.

Referring now to FIGS. 12-14, in one or more examples, the system 150 includes a fairing 154. The fairing 154 is coupled to the wing 108. The fairing 154 is configured to cover at least a portion of the apparatus 100. For example, the fairing 154 covers the support fitting 106, the linkage 148 (e.g., the first link 110 and the second link 112) and the carrier fitting 138. The fairing 154 is positioned to be parallel to the airstream flowing over the wing 108.

In one or more examples, the carrier fitting 138 includes a carrier first portion 140 and a carrier second portion 142. The carrier first portion 140 is coupled to the first link 110 and, optionally, to the second link 112, such as at the second joint 204. The carrier second portion 142 extends from the carrier first portion 140 at an oblique angle. The carrier second portion 142 is configured to be coupled to the wing flap 102. The carrier second portion 142 being oriented at the oblique angle relative to the carrier first portion 140 reduces the frontal area required by the fairing 154, thereby reducing drag.

In one or more examples, the linkage 148 extends approximately perpendicularly from the trailing edge of the wing 108. In many modern aircraft, the wings 108 are swept. As such, the linkage 148 of the apparatus 100 may not be parallel to the airstream flowing over the wing 108. The oblique angle of the carrier second portion 142 relative to the carrier first portion 140 positions the carrier second portion 142 approximately parallel to the airstream and parallel to the fairing 154. Therefore, the fairing 154 having a reduced lateral dimension can cover the entire carrier fitting 138 (e.g., as shown in FIGS. 12 and 13). In FIG. 13, the linkage 148 is not shown coupled to the carrier fitting 138 for the purpose of clarity of illustration.

Referring again to FIGS. 3 and 4, in one or more examples, the system 150 includes a drive mechanism 152.

The drive mechanism 152 is configured to move the carrier fitting 138 relative to the linkage 148 and, thereby, move the wing flap 102 between a retracted position and an extended position relative to the wing 108.

In one or more examples, the drive mechanism 152 includes a drive actuator 216 and a drive link 218. The drive actuator 216 may be any suitable type of actuator, such as an electromechanical actuator, that is configured to actuate the wing flap 102 between retracted and extended positions. In an example, the drive actuator 216 is a geared rotary actuator. In other examples, the drive actuator 216 may be various other types of devices that are used to move the wing flap 102. The drive link 218 is arranged between and is coupled to the drive actuator 216 and to the carrier fitting 138.

In one or more examples, during operation of the wing flap 102, the drive actuator 216 turns a drive arm. Rotation of the drive arm pushes or pulls on the drive link 218. Motion (for example, pushing towards, or pulling away) pushes or pulls the carrier fitting 138. The carrier fitting 138 rotates about a point (e.g., the second joint 204) relative to the linkage 148. In this manner, the wing flap 102 may be actuated between extended and retracted positions.

Figure 15:
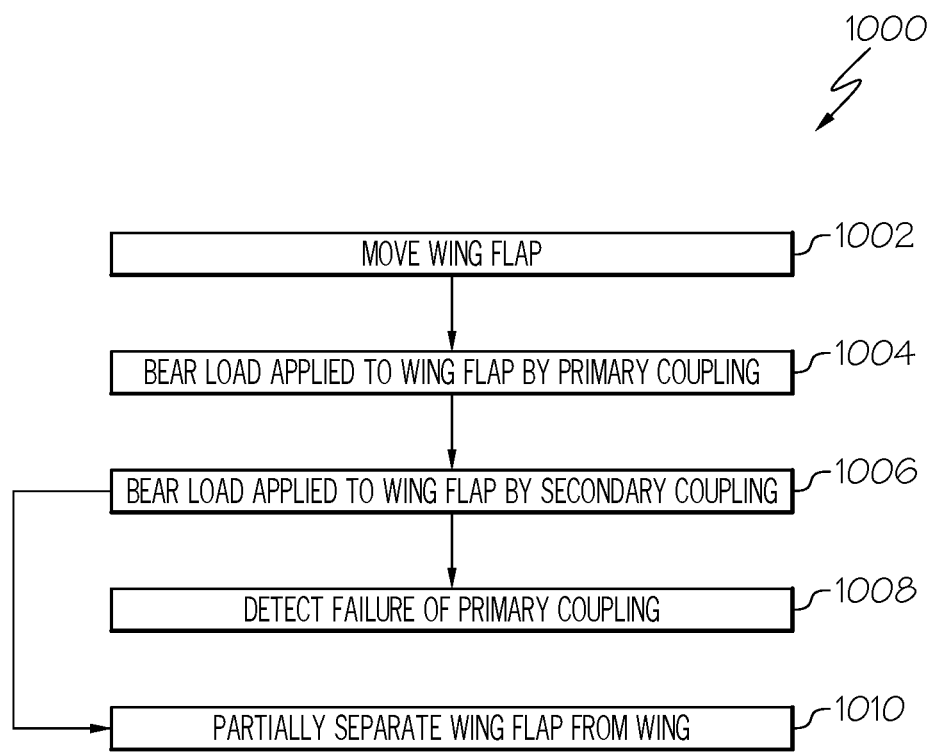
FIG. 15 is a flow diagram of an example of a method of supporting the wing flap.

Referring now to FIG. 15, by way of examples, the present disclosure is also directed to a method of supporting a wing flap of an aircraft (referred to herein as "method" 1000). In one or more examples, implementation of the method 1000 is performed using the system 150.

In one or more examples, the method 1000 includes a step of (block 1002) moving the wing flap 102 to between the retracted and extended positions. For example, the wing flap 102 is coupled to the wing 108 using the apparatus 100 (e.g., the support fitting 106, the linkage 148 and the carrier fitting 138). The wing flap 102 is actuated between extended and retracted positions using the drive mechanism 152.

The method 1000 also includes a step of (block 1004) bearing a load applied to the wing flap 102 by the primary coupling 116. For example, a compressive load is reacted and transferred from the wing flap 102 to the wing 108 through the first link 110. During normal operation, a tensile load is reacted and transferred from the wing flap 102 to the wing 108 along the second link 112 via the primary coupling 116 of the fail-safe joint 114 between the second link 112 and the support fitting 106, which bears the tensile load.

The method 1000 further includes a step of (block 1006) bearing the load applied to the wing flap 102 by the secondary coupling 118 upon failure of the primary coupling 116. For example, following failure of the primary coupling 116, the tensile load is reacted and transferred from the wing flap 102 to the wing 108 through the second link 112 via the secondary coupling 118 of the fail-safe joint 114 between the second link 112 and the support fitting 106, which bears the tensile load.

In one or more examples, the method 1000 includes a step of (block 1008) detecting failure of the primary coupling 116. For example, detection of failure of the primary coupling 116 may be performed using the sensor 144 and/or the pin coupling 146.

In one or more examples, the method 1000 includes a step of (block 1010) at least partially separating the wing flap 102 from the wing 108. For example, in an emergency scenario, the second link 112 separates from the support fitting 106 at the fail-safe joint 114 to enable the wing flap 102 to rotate relative to the wing 108 beyond its normal range of motion.

Accordingly, as described and illustrated herein, the disclosed apparatus 100, system 150 and method 1000 may be used to support and actuator a single slotted, simple hinged wing flap 102. The linkage 148 provides the support structure and may form a triangular shaped truss including of three structural members (e.g., the support fitting 106, the first (e.g., upper or compression) link 110 and the second (e.g., lower or tension) link 112.

The support fitting 106 has the first joint 202 (e.g., an upper joint) and the fail-safe joint 114 (e.g., a lower joint). The first (e.g., forward) end of the first link 110 is attached to the first joint 202 (e.g., upper wing box attachment joint) of the support fitting 106 (e.g., spar fitting 132). The first (e.g., forward end) of the second link is attached to the fail-safe joint 114 (e.g., a lower wing box attachment joint) of the support fitting 106 (e.g., wing fitting 134). The second (e.g., aft) ends of the first link 110 and the second link 112 may share a common second joint 204 (e.g., as shown in FIG. 3) or may have a dedicated second joint 204 and third joint 206, respectively (e.g., as shown in FIG. 4).

When the wing flap 102 experiences lift, the first link 110 goes into compression while the second link 112 goes into tension. The wing flap hinge joint (e.g., second joint 204) is located at the very aft end of the first link 110. The first joint 202 and the fail-safe joint 114 may be joints that include a lug, a clevis and a pin.

The fail-safe joint 114 is unique and includes two pins (e.g., primary pin 120 and secondary pin 124) mounted close together in series along centerline of the second link 112. Both pins are hollow and share the same lug and clevis mount. The two pins may be referred to as fuse pins because they fuse at a specified load. The primary pin 120 is a primary load-bearing pin. The secondary pin 124 is a fail-safe load-bearing pin. The primary pin 120 is in a tight hole (e.g., primary pin aperture 122) and carries all flap loads while the secondary pin 124 is positioned in a slotted hole (e.g., the aperture first portion 128 of the secondary pin aperture 126) and is unloaded. If the primary pin 120 fails, the secondary pin 124 moves within the slotted hole (e.g., to the aperture second portion 130 of the secondary pin aperture 126) loads up.

The disclosed apparatus 100, system 150 and method 1000 also provide for a simple lightweight flap support mechanism that is fail-safe and meets break away requirements to protect the wing fuel tank in the event of an emergency landing.

The disclosed apparatus 100, system 150 and method 1000 also provides indication of failure in the primary load path.

The disclosed apparatus 100, system 150 and method 1000 also orients flap support members (e.g., the carrier fitting 138) to that aerodynamic drag is reduced.

Figure 16:
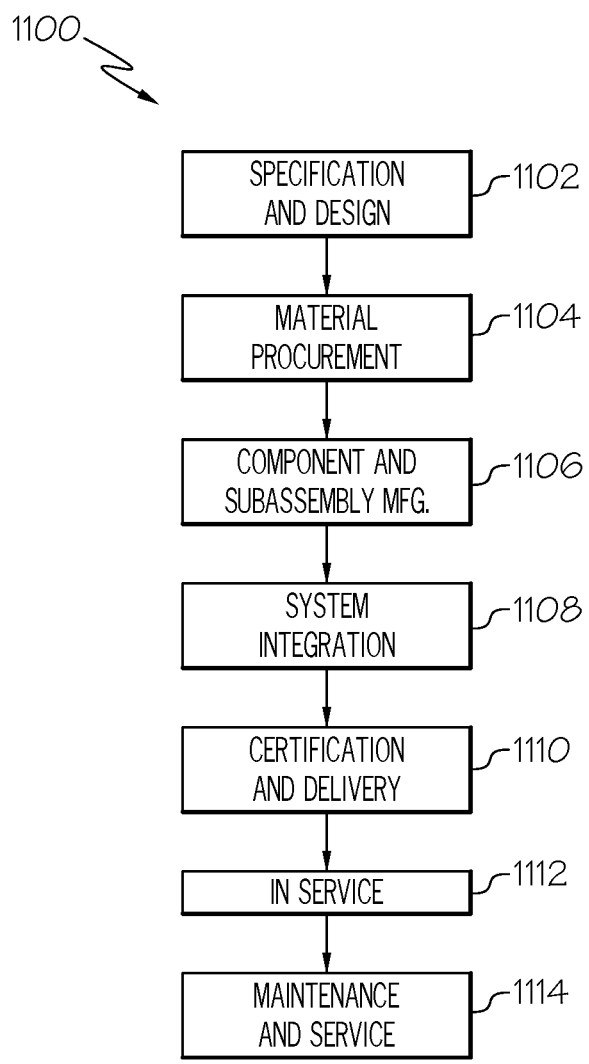
FIG. 16 is a flow diagram of an aircraft manufacturing and service methodology.

Referring now to FIGS. 1 and 16, examples of the apparatus 100, the system 150 and the method 1000 may be related to, or used in the context of, an aircraft manufacturing and service method 1100, as shown in the flow diagram of FIG. 16 and the aircraft 104, as schematically illustrated in FIG. 1. For example, the aircraft 104 and/or the aircraft production and service methodology 1100 may utilize the apparatus 100, system 150 and/or method 1000 described with respect to FIGS. 2-12.

Referring to FIG. 1, which schematically illustrates an example of the aircraft 104 produced by the illustrative method 1100. The aircraft 104 may include an airframe 160 that forms the wings 108 and the fuselage 156 having an interior 172. The aircraft 104 also includes a plurality of high-level systems 162. Examples of the high-level systems 162 include one or more of a propulsion system 164, an electrical system 166, a hydraulic system 168, and an environmental control ("environmental") system 170. In other examples, the aircraft 104 may include any number of other types of systems, such as a communications system, a flight control system, a guidance system, a weapons system, and the like.

Referring to FIG. 16, during pre-production, the method 1100 includes specification and design of the aircraft 104 (block 1102) and material procurement (block 1104). During production of the aircraft 104, component and subassembly manufacturing (block 1106) and system integration (block 1108) of the aircraft 104 take place. Thereafter, the aircraft 104 goes through certification and delivery (block 1110) to be placed in service (block 1112). Routine maintenance and service (block 1114) includes modification, reconfiguration, refurbishment, etc. of one or more systems of the aircraft 104.

Each of the processes of the method 1100 illustrated in FIG. 16 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the aircraft 104, the apparatus 100, the system 150 and the method 1000 shown and described herein may be employed during any one or more of the stages of the manufacturing and service method 1100 shown in the flow diagram illustrated by FIG. 16. In an example, implementations of the apparatus 100, system 150 and/or method 1000 may form a portion of component and subassembly manufacturing (block 1106) and/or system integration (block 1108). For example, production of the aircraft 104 that includes the apparatus 100 and/or system 150 may correspond to component and subassembly manufacturing (block 1106). Further, the apparatus 100 and/or system 150 may be utilized in a manner similar to components or subassemblies prepared while the aircraft 104 is in service (block 1112). Also, the apparatus 100 and/or system 150 may be utilized during system integration (block 1108) and certification and delivery (block 1110). Similarly, implementations of the apparatus 100, system 150 and/or method 1000 may be utilized, for example and without limitation, while the aircraft 104 is in service (block 1112) and during maintenance and service (block 1114).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to support and actuation systems of other types of vehicles (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-14, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-14, referred to above, need be included in every example and not all elements, features, and/or components described herein are necessarily depicted in each illustrative example. Accordingly, some of the elements, features, and/or components described and illustrated in FIGS. 1-14 may be combined in various ways without the need to include other features described and illustrated in FIGS. 1-14, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-14, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-14, and such elements, features, and/or components may not be discussed in detail herein with reference to each of FIGS. 1-14. Similarly, all elements, features, and/or components may not be labeled in each of FIGS. 1-14, but reference numerals associated therewith may be utilized herein for consistency.

In FIGS. 15 and 16, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 15 and 16 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the apparatus 100, the system 150 and the method 1000 have been shown and described, modifications may occur to those skilled in the art upon reading the specification. The present application includes such modifications and is limited only by the scope of the claims.

What is claimed is:

1. An apparatus for supporting a wing flap of an aircraft, the apparatus comprising:
   a support fitting configured to be coupled to a wing of the aircraft;
   a first link coupled to the support fitting and configured to be hingedly coupled to the wing flap; and
   a second link separably coupled to the support fitting by a fail-safe joint and configured to be hingedly coupled to the wing flap,
   wherein the fail-safe joint comprises:
      a primary coupling configured to bear a load between the second link and the support fitting; and
      a secondary coupling configured to bear the load between the second link and the support fitting upon failure of the primary coupling.

2. The apparatus of claim 1, wherein the fail-safe joint is configured to separate the second link from the support fitting in response to the load having a predetermined magnitude.

3. The apparatus of claim 1, wherein the load is a shear load.

4. The apparatus of claim 1, further comprising a sensor configured to detect the failure of the primary coupling.

5. The apparatus of claim 1, wherein:
   the primary coupling is configured to separate the second link from the support fitting in response to a first instance of the load having a predetermined magnitude; and
   the secondary coupling is configured to separate the second link from the support fitting in response to a second instance of the load having the predetermined magnitude.

6. The apparatus of claim 1, wherein:
   the primary coupling comprises:
      a primary pin aperture formed in the support fitting; and
      a primary pin fixed to the second link and received by the primary pin aperture;
   the secondary coupling comprises:
      a secondary pin aperture formed in the support fitting and comprising an aperture first portion and an aperture second portion; and
      a secondary pin fixed to the second link and received by the aperture first portion of the secondary pin aperture; and
   the secondary pin is configured to move into the aperture second portion of the secondary pin aperture upon failure of the primary coupling.

7. The apparatus of claim 6, wherein each one of the primary pin and the secondary pin comprises a hollow tubular body.

8. The apparatus of claim 7, wherein the hollow tubular body of the primary pin and the secondary pin is configured to fail in response to the load having a predetermined magnitude.

9. The apparatus of claim 6, further comprising a sensor configured to detect when the secondary pin moves into the aperture second portion of the secondary pin aperture.

10. The apparatus of claim 6, further comprising a pin coupling coupled to the primary pin and the secondary pin, wherein the pin coupling is configured to break when the secondary pin moves into the aperture second portion of the secondary pin aperture.

11. The apparatus of claim 1, wherein, with the wing flap deployed:
   the first link is configured to receive a compressive load; and
   the second link is configured to receive a tensile load.

12. The apparatus of claim 1, wherein the second link comprises a double-layered construction.

13. The apparatus of claim 1, wherein the support fitting comprises:
- a spar fitting configured to be coupled to a spar of the wing; and
- a wing fitting configured to be coupled to the spar under the wing.

14. The apparatus of claim 13, wherein the support fitting further comprises a backup fitting configured to be coupled to the spar opposite the spar fitting.

15. The apparatus of claim 1, further comprising a carrier fitting, wherein:
- the first link is hingedly coupled to the carrier fitting;
- the second link is coupled to the first link; and
- the carrier fitting is configured to be coupled to the wing flap.

16. The apparatus of claim 15, wherein the carrier fitting comprises:
- a carrier first portion hingedly coupled to the first link; and
- a carrier second portion extending from the carrier first portion at an oblique angle.

17. An aerodynamic system of an aircraft, the aerodynamic system comprising:
- a support fitting configured to be coupled to a wing of the aircraft;
- a first link coupled to the support fitting;
- a second link separably coupled to the support fitting by a fail-safe joint and coupled to the first link;
- a carrier fitting hingedly coupled to the first link;
- a wing flap coupled to the carrier fitting; and
- a drive mechanism configured to move the carrier fitting to move the wing flap between a retracted position and an extended position, wherein the fail-safe joint comprises:
- a primary coupling configured to bear a load between the second link and the support fitting; and
- a secondary coupling configured to bear the load between the second link and the support fitting upon failure of the primary coupling.

18. The aerodynamic system of claim 17, wherein:
the primary coupling is configured to separate the second link from the support fitting in response to a first instance of the load having a predetermined magnitude; and
the secondary coupling is configured to separate the second link from the support fitting in response to a second instance of the load having the predetermined magnitude.

19. The aerodynamic system of claim 17, further comprising a sensor configured to detect the failure of the primary coupling.

20. A method of supporting a wing flap of an aircraft, the method comprising:
- moving the wing flap to an extended position relative to a wing of the aircraft;
- bearing a compression load applied from the wing flap to the wing by a first link that couples the wing flap and the wing;
- bearing a tensile load applied from the wing flap to the wing by a primary coupling of a fail-safe joint of a second link that couples the wing flap and the wing; and
- bearing the tensile load applied from the wing flap to the wing by a secondary coupling of the fail-safe joint in response to failure of the primary coupling of the fail-safe joint.

* * * * *